(12) United States Patent
Yamato et al.

(10) Patent No.: US 7,759,283 B2
(45) Date of Patent: Jul. 20, 2010

(54) CATALYST FOR PURIFYING EXHAUST GAS (75) Inventors: Masanori Yamato, Toyota (JP); Takatoshi Shinyoshi, Toyota (JP); Takumi Suzawa, Okazaki (JP); Keiji Ito, Nagoya (JP)

(73) Assignees: Toyota Jidosha Kabushiki Kaisha, Toyota-shi, Aichi-ken (JP); Denso Corporation, Kariya-shi, Aichi-ken (JP)

( * ) Notice: Subject to any disclaimer, the term of this patent is extended or adjusted under 35 U.S.C. 154(b) by 0 days.

(21) Appl. No.: 12/375,013

(22) PCT Filed: Jul. 24, 2007

(86) PCT No.: PCT/JP2007/064496
§ 371 (c)(1), (2), (4) Date: Jan. 23, 2009

(87) PCT Pub. No.: WO2008/013169
PCT Pub. Date: Jan. 31, 2008

(65) Prior Publication Data
US 2009/0239745 A1 Sep. 24, 2009

(30) Foreign Application Priority Data
Jul. 25, 2006 (JP) .............................. 2006-202099

(51) Int. Cl.
*B01J 23/00* (2006.01)
*B01J 21/00* (2006.01)
*B01J 20/00* (2006.01)

(52) U.S. Cl. .................. 502/339; 502/261; 502/262; 502/326; 502/327; 502/332; 502/333; 502/334; 502/415; 502/439; 502/527.12; 502/527.13; 502/527.19

(58) Field of Classification Search ................. 502/326, 502/327, 332, 333, 334, 339, 415, 439, 527.12, 502/527.13, 527.19, 261, 262
See application file for complete search history.

(56) References Cited

U.S. PATENT DOCUMENTS 3,794,588 A * 2/1974 Stiles ..................... 502/174

(Continued)

FOREIGN PATENT DOCUMENTS

EP 0 566 401 10/1993

(Continued)

OTHER PUBLICATIONS

Extended European Search Report dated Jul. 31, 2009, for EP Appln. No. 07791222.8-2113.

*Primary Examiner*—Cam N Nguyen
(74) *Attorney, Agent, or Firm*—Finnegan, Henderson, Farabow, Garrett & Dunner, LLP (57) ABSTRACT

To improve a CO conversion in stoichiometry-lean atmosphere, and additionally to prevent the rise of pressure loss.

A catalytic coating layer 2 is constituted of a lower layer 20 including an oxygen storage capacity material and an upper layer 21 being formed on a surface of the lower layer 20 and including a catalytic noble metal, and a thickness of the upper layer is adapted so as to be 5 μm-40 μm. The upper layer 21 is good in terms of gas diffusibility, and thereby OSC resulting from the oxygen storage capacity material being included in the lower layer 20 is demonstrated maximally.

3 Claims, 5 Drawing Sheets

U.S. PATENT DOCUMENTS

| | | | | |
|---|---|---|---|---|
| 5,075,275 | A | * | 12/1991 | Murakami et al. .......... 502/303 |
| 5,334,570 | A | * | 8/1994 | Beauseigneur et al. ...... 502/304 |
| 5,459,119 | A | * | 10/1995 | Abe et al. ................... 502/326 |
| 5,496,788 | A | * | 3/1996 | Domesle et al. ............. 502/333 |
| 5,525,307 | A | * | 6/1996 | Yasaki et al. ................ 422/171 |
| 5,556,825 | A | * | 9/1996 | Shelef et al. ................ 502/303 |
| 5,869,419 | A | * | 2/1999 | Obayashi et al. ............ 502/305 |
| 5,948,377 | A | * | 9/1999 | Sung ........................ 423/213.5 |
| 5,989,507 | A | * | 11/1999 | Sung et al. ............... 423/213.5 |
| 6,071,850 | A | * | 6/2000 | Friedman et al. ............ 502/439 |
| 6,087,298 | A | * | 7/2000 | Sung et al. .................. 502/333 |
| 6,514,905 | B1 | * | 2/2003 | Hanaki et al. ............... 502/328 |
| 6,667,018 | B2 | * | 12/2003 | Noda et al. ............... 423/213.5 |
| 6,764,665 | B2 | * | 7/2004 | Deeba et al. ............... 423/239.1 |
| 6,777,370 | B2 | * | 8/2004 | Chen .......................... 502/241 |
| 6,787,500 | B2 | * | 9/2004 | Ito et al. ..................... 502/180 |
| 6,806,225 | B1 | * | 10/2004 | Ikeda et al. ................. 502/326 |
| 6,881,384 | B1 | * | 4/2005 | Uenishi et al. .............. 422/177 |
| 6,967,186 | B2 | * | 11/2005 | Takaya et al. ............... 502/325 |
| 7,045,483 | B2 | * | 5/2006 | Noda et al. .................. 502/243 |
| 7,056,859 | B2 | * | 6/2006 | Hachisuka .................. 502/327 |
| 7,208,444 | B2 | * | 4/2007 | Kikuchi et al. .............. 502/300 |
| 7,374,729 | B2 | * | 5/2008 | Chen et al. .................. 422/177 |
| 7,399,728 | B2 | * | 7/2008 | LaBarge ...................... 502/325 |
| 7,517,830 | B2 | * | 4/2009 | Nomura et al. .............. 502/302 |
| 2003/0083193 | A1 | * | 5/2003 | Takaya et al. ................ 502/304 |
| 2003/0083197 | A1 | * | 5/2003 | Noda et al. .................. 502/344 |
| 2003/0100446 | A1 | * | 5/2003 | Hase et al. ................... 502/302 |
| 2004/0053781 | A1 | * | 3/2004 | Okawara ..................... 502/304 |
| 2005/0054526 | A1 | * | 3/2005 | Steinke et al. ............... 502/439 |
| 2005/0137079 | A1 | * | 6/2005 | LaBarge ...................... 502/150 |
| 2006/0154817 | A1 | * | 7/2006 | Nomura et al. .............. 502/439 |
| 2007/0207078 | A1 | * | 9/2007 | Nochi et al. ............... 423/239.1 |
| 2008/0038172 | A1 | * | 2/2008 | Chen et al. ................ 423/213.2 |
| 2009/0104089 | A1 | * | 4/2009 | Hirth et al. .................. 422/177 |
| 2009/0275468 | A1 | * | 11/2009 | Taki et al. .................... 502/304 |

FOREIGN PATENT DOCUMENTS

| | | |
|---|---|---|
| EP | 1 121 981 | 8/2001 |
| JP | 62-074453 | 4/1987 |
| JP | 10-263416 | 10/1998 |
| JP | 2000-237602 | 9/2000 |
| JP | 2003-117353 | 4/2003 |
| JP | 2003-326170 | 11/2003 |
| JP | 2004-330025 | 11/2004 |
| JP | 2005-279437 | 10/2005 |
| JP | 2005-349293 | 12/2005 |
| JP | 2006-035043 | 2/2006 |
| JP | 2006-175322 | 7/2006 |
| WO | WO 02/089977 | 11/2002 |

* cited by examiner

CATALYST FOR PURIFYING EXHAUST GAS

CROSS-REFERENCE TO RELATED APPLICATIONS

This application is a national phase application of International Application No. PCT/JP2007/064496, filed Jul. 24, 2007, and claims the priority of Japanese Application No. 2006-202099, filed Jul. 25, 2006, the contents of both of which are incorporated herein by reference.

TECHNICAL FIELD

The present invention relates to a catalyst for purifying exhaust gas for automotive application.

BACKGROUND ART

In order to purify automotive exhaust gases, various catalysts for purifying exhaust gas, such as oxidizing catalysts and three-way catalysts, have been used. These catalysts for purifying exhaust gas are those that are completed by loading a noble metal, such as Pt, Rh or Pd, onto a support comprising a porous oxide, such as γ-alumina. The porous-oxide species, or the noble-metal species have been used by combining them variously depending on their purposes.

For example, although Rh is a necessary and indispensable noble metal for catalyst for purifying exhaust gas because the reducing activity is high, there has been such a drawback that the activity degrades when being loaded in proximity to Pt. Hence, the following have been adopted: a method of turning a catalytic layer into two layers and then Pt and Rh are loaded respectively onto the respective layers, or a method of loading Pt and Rh respectively onto different oxide powders and thereafter mixing them; and thereby it has been carried out to load Pt and Rh separately to each other.

Moreover, it has been know that ceria, or ceria-zirconia solid solutions, and the like, exhibit oxygen sorbing/desorbing capacity (OSC). By including such an oxide exhibiting OSC, oxygen is stored when exhaust-gas atmosphere becomes oxygen rich; and the stored oxygen is released when the exhaust-gas atmosphere becomes oxygen poor. Therefore, it is possible to relax atmosphere fluctuation, and thereby the activities of three-way catalyst improve.

And, the following have come to be understood: the granular growth is suppressed in Pt loaded on ceria; and catalyst in which Rh is loaded on zirconia shows hydrogen generating capacity in exhaust gas, and accordingly the $NO_x$ purifying activity is high; and so forth. Consequently, when designing a catalyst for purifying exhaust gas, the combination of porous-oxide support species and noble-metal species have been becoming an extremely important factor.

However, in the above-described two-layer-structured catalyst for purifying exhaust gas, there has been such a problem that exhaust gases are less likely to reach down to the lower layer when the gas diffusibility in the upper layer is low and thereby the demonstration of performance resulting from catalytic metal that is loaded on the lower layer becomes insufficient.

Hence, in Japanese Unexamined Patent Publication (KOKAI) Gazette No. 2003-326,170 and Japanese Unexamined Patent Publication (KOKAI) Gazette No. 2004-330,025, there are set forth a method of forming an upper layer of a slurry in which activated carbon that possesses large particle diameters to some extent, or the like, is mixed, and then forming an upper layer with large porosity by burning it out upon its calcination. In a catalyst for purifying exhaust gas, catalyst which possesses an upper layer being thus formed, the purifying performance improves, because the gas diffusibility in the upper layer improves considerably and thereby the contacting ability to noble metal also improves.

By the way, for the support substrate that is used in three-way catalyst, and the like, a honeycomb substrate that possesses an innumerable number of cellular passages have been used widely. This honeycomb substrate is formed of heat-resistant ceramic, such as cordierite, and has cross-sectionally quadrangular cellular passages. Although a coating layer is formed by wash coating a slurry onto such a honeycomb substrate, there has been such a phenomenon that the nearer it is coated onto the cornered portions of the cellular passages the thicker it is coated because of the slurry's surface tension. Accordingly, the gas diffusibility is low at the thick parts; in the case where a noble-metal loading amount is much, the loading density of catalytic noble metal becomes high at thin portions; and thereby the problem of granular growth arises when being employed.

Hence, in Japanese Unexamined Patent Publication (KOKAI) Gazette No. 10-263,416 or Japanese Unexamined Patent Publication (KOKAI) Gazette No. 2000-237,602, there is a description on using a honeycomb substrate that possesses cross-sectionally hexagonal cellular passages. When using a honeycomb substrate that possesses cross-sectionally hexagonal cellular passages like this, it is possible to relax the phenomenon that the nearer it is to the cornered portions the thicker it becomes.

Patent Literature No. 1: Japanese Unexamined Patent Publication (KOKAI) Gazette No. 2003-326,170;

Patent Literature No. 2: Japanese Unexamined Patent Publication (KOKAI) Gazette No. 2004-330,025;

Patent Literature No. 3: Japanese Unexamined Patent Publication (KOKAI) Gazette No. 10-263,416; and Patent Literature No. 4: Japanese Unexamined Patent Publication (KOKAI) Gazette No. 2000-237,602

DISCLOSURE OF THE INVENTION

Assignment to be Solved by the Invention

In view of the aforementioned related arts, it has been thought of a three-way catalyst that possesses a two-layered coating layer in which the following are laminated: a catalytic coating layer being loaded with a co-catalyst exhibiting OSC, such as ceria, and Pt; and a catalytic coating layer being made by loading Rh onto zirconia. In accordance with this three-way catalyst, it is possible to avoid the drawback resulting from alloying because Pt and Rh are loaded separately. Moreover, in Pt being loaded onto ceria, and the like, there is the tendency that the granular growth is suppressed; the effect of relaxing atmosphere fluctuation by means of OSC, and the effect of improving $NO_x$-purifying performance by means of $Rh/ZrO_2$ are accomplished as well. Therefore, it has been expected a high three-way activity can be accomplished.

However, in a catalyst that possesses a two-layered catalytic coating layer, the contacting efficiency to exhaust gas becomes low in the lower layer compared with that in the upper layer. And, in the case where a catalytic coating layer that includes a co-catalyst exhibiting OSC is turned into the lower layer, it has become apparent that the OSC degrades greatly when the upper layer becomes thicker; and thereby the CO conversion upon being fluctuated to lean atmosphere degrades greatly.

In this case, when an absolute amount of the co-catalyst exhibiting OSC is made greater by thickening the lower layer's thickness, it is possible to satisfy the OSC, and thereby the CO conversion in stoichiometry-lean atmosphere also improves. But, when doing, the thickness of the catalytic coating layer as a whole becomes thicker to result in the rise of pressure loss, thereby affecting engine performance adversely.

The present invention is one which has been done in view of the aforementioned circumstances, and it is an assignment to be solved to improve the CO conversion in stoichiometry-lean atmosphere especially, and additionally to prevent the rise of pressure loss.

Means for Solving the Assignment

A characteristic of a catalyst for purifying exhaust gas according to the present invention which solves the aforementioned assignment lies in that it is a catalyst for purifying exhaust gas, the catalyst comprising: a honeycomb-configured support substrate possessing a large number of cellular passages being demarcated by cellular partition walls; and a catalytic coating layer being formed on a surface of the cellular partition walls; and in that the catalytic coating layer comprises a lower layer including an oxygen storage capacity material; and an upper layer being formed on a surface of the lower layer and including a catalytic noble metal; and a thickness of the upper layer is 5 μm-40 μm.

It is further desirable that the thickness of the upper layer can be 30 μm or less.

Moreover, it is describable that the catalytic coating layer can exhibit a total thickness falling in a range of 10 μm-80 μm that accounts for 90% or more of the entirety.

Furthermore, it is desirable that at least Rh can be loaded onto the upper layer; and at least one of Pt and Pd can be loaded onto the lower layer.

EFFECT OF THE INVENTION

In accordance with the catalyst for purifying exhaust gas according to the present invention, the upper layer is good in term of gas diffusibility because it exhibits a thickness of 40 μm or less, and thereby the OSC, which results from the oxygen storage capacity material that is included in the lower layer, can be demonstrated maximally. Therefore, the CO conversion in stoichiometry-lean atmosphere improves especially. Moreover, since the upper layer has a thickness of 5 μm or more, the granular growth of catalytic noble metal in service can be inhibited. Therefore, it is good in terms of the durability of purifying performance.

Moreover, when a total thickness of the catalytic coating layer is adapted into being so that a range of 10 μm-80 μm accounts for 90% or more of the entirety, it is possible to avoid the rise of pressure loss while securing an absolute magnitude for oxygen sorbing/desorbing amount.

| Explanation on Reference Numerals |
|---|
| 1: Honeycomb Substrate; |
| 2: Catalytic Coating Layer; |
| 10: Cellular Partition Wall; |
| 11: Cellular Passage; |
| 20: Lower Layer; and |
| 21: Upper Layer |

BEST MODE FOR CARRYING OUT THE INVENTION

A catalyst for purifying exhaust gas according to the present invention comprises a support substrate, and a catalytic coating layer. The catalytic substrate is a honeycomb-configured one which possesses a large number of cellular passages that are demarcated by cellular partition walls; and it is possible to use monolithic substrates that are formed of heat-resistant ceramic, such as cordierite, metallic substrates in which corrugated plates and flat plates that are made of metallic foil are laminated alternately, and the like. As for a number of the cellular passages and their cross-sectional area, it is possible to use those which have been used heretofore. In a common catalyst for purifying exhaust gas for automotive application, a number of the cells is 400-900 pieces/in$^2$ and a maximum diameter of the cellular passages is 700 μm-1,300 μm.

On a surface of the cellular partition walls, the catalytic coating layer is formed. The catalytic coating layer comprises a lower layer, which includes an oxygen storage capacity material and an upper layer, which is formed on a surface of the lower layer and which includes a catalytic noble metal. With a construction in which the upper layer and lower layer are reversed, since the catalytic actions of the catalytic noble metal that is included in the upper layer have degraded, it is not practical.

As for the oxygen storage capacity material that is included in the lower layer, beginning with $CeO_2$, $CeO_2$—$ZrO_2$ composite oxides, $CeO_2$—$ZrO_2$—$Al_2O_3$ composite oxides, and the like, can be exemplified. It is allowable to use other porous oxides, such as $Al_2O_3$, $TiO_2$ and $ZrO_2$, combinedly therewith.

It is desirable to load at least one member selected from the group consisting of Pt and Pd onto this lower layer, though a certain extent of OSC is demonstrated without loading any catalytic noble metal onto it. Thus, OSC improves furthermore.

It is preferable that a forming amount of the lower layer can be adapted so as to be 50 g-250 g per 1-L catalyst. This corresponds to a thickness of 5 μm-50 μm. When the forming amount of the lower layer is less than this range, an absolute magnitude of oxygen sorbing/desorbing amount comes to be insufficient. Moreover, in the case where a catalytic noble metal is loaded thereon, it undergoes granular growth by means of heat in service so that the activities come to degrade, because its loading density rises. In addition, when the forming amount of the lower layer becomes greater than this range, a thickness of the upper layer becomes as extremely thin as less than 5 μm so that the granular growth of loaded catalytic noble metal occurs, or a total thickness of the catalytic coating layer becomes thicker so that the rise of pressure drop occurs even when a thickness of the upper layer is adapted so as to fall in a range of 5 μm-40 μm.

Moreover, it is preferable that a loading amount of a catalytic noble metal in the lower layer can be adapted so as to be 0.1 g-10 g per 1-L catalyst. When the loading amount is less than this range, OSC becomes insufficient so that the CO conversion in stoichiometry-lean atmosphere degrades; the effect saturates even when loading it greater than this range; and there arises such a drawback that the activities degrade by means of granular growth in service.

The upper layer is one which makes a catalytic noble metal indispensable; and comprises a support that comprises a porous oxide, and a catalytic noble metal. As for the catalytic noble metal, although it is possible to select from Pt, Rh, Pd, Ir, or the like, it is desirable to use at least Rh that is good in terms of $NO_x$ purifying activity. Moreover, as for the porous oxide, although $Al_2O_3$, $TiO_2$, $ZrO_2$, or the like, can be used, it is desirable to use at least $ZrO_2$ in the case of using Rh as the catalytic noble metal. In this case, when using $ZrO_2$ mainly, it is also possible to use the other porous oxides, or $CeO_2$, and the like, combinedly therewith in such a range that does not impair performance.

The upper layer is formed in a thickness of 5 μm-40 μm. This corresponds to 50 g-250 g per 1-L catalyst. When the thickness of the upper layer becomes thinner than this range, it undergoes granular growth by means of heat in service so that the activities come to degrade because a loading density of the catalytic noble metal rises. Moreover when the forming amount of the upper layer becomes greater than this range, the gas diffusibility deteriorates so that OSC resulting from the oxygen storage capacity material of the lower layer degrades, and thereby the CO conversion in stoichiometry-lean atmosphere degrades greatly. In addition, a total thickness of the catalytic coating layer becomes thicker so that the rise of pressure drop occurs. It is furthermore desirable to adapt the thickness of the upper layer so as to be 30 μm or less.

Moreover, it is preferable that a loading amount of the catalytic noble metal in the upper layer can be adapted so as to be 0.1 g-3 g per 1-L catalyst. When the loading amount is less than this range, the purifying activities resulting from the catalytic noble metal degrade; the effect saturates even when loading it greater than this range; and there arises such a drawback that the activities degrade by means of granular growth in service.

Further, in the catalyst for purifying exhaust gas according to the present invention, it is desirable to constitute so that a total thickness of the catalytic coating layer can fall in a range of range of 10 μm-80 μm that accounts for 90% or more of the entirety. The total thickness that is 10 μm-80 μm corresponds to a forming amount of the catalytic coating layer per 1-L catalyst that is 120-350 g. When the total thickness is less than 10 μm, a loading density of the catalytic noble metal becomes too high so that the activities degradation resulting from granular growth occurs; and the rise of pressure drop occurs when it surpasses 80 μm.

By the way, in the case of forming the catalytic coating layer by an ordinary wash coating method, fluctuations occurs in the coating thickness depending on cross-sectional configurations of the cellular passages. In the case of a usual cross-sectionally quadrangular cells, the nearer it is to the cornered portions the thicker it becomes, and thereby a thickness of the cornered portions has surpassed 80 μm when coating it in an amount of 150 g or more per 1-L catalyst. Moreover, at other than the cornered portions, it is often the case that it becomes too thin because it becomes less than 5 μm.

In this case, it is possible to make the thickness difference between the cornered portions and the flattened portions smaller by coating a slurry while making the viscosity lower. However, with a slurry having low viscosity, it becomes necessary to do coating for a plurality of times in order to secure a given coating amount. Therefore, not only it results in pushing up the cost, but also a maximum inside diameter of the cellular passages after coating becomes short (a hydraulic diameter becomes short), compared with the case where a slurry with high viscosity is coated. Accordingly, even when the coating layer is formed in an identical amount, there is such a drawback that the pressure loss enlarges more in one being made by coating a slurry with low viscosity for a plurality of times than in the latter.

Hence, instead of a honeycomb substrate that possesses cross-sectionally quadrangular cellular passages, it is desirable to use a honeycomb substrate that possesses cellular passages with a polygonal cross section that is cross-sectionally hexagonal or more. Moreover, in the case of using a honeycomb substrate with cross-sectionally quadrangular cells, it is allowable to turn them into polygonal cells that are cross-sectionally hexagonal or more by filling the cornered portions up with a heat-resistant material in advance. For example, when using a honeycomb substrate that possesses cross-sectionally hexagonal cellular passages, it is possible to reduce the pressure drop by about 12% compared with the case of using a honeycomb substrate that possesses cross-sectionally quadrangular cells, even if the coating layer is formed in an identical amount.

EXAMPLES

Hereinafter, the present invention will be explained in detail by means of an example and a comparative example as well as a testing example.

Example No. 1

Figure 1:
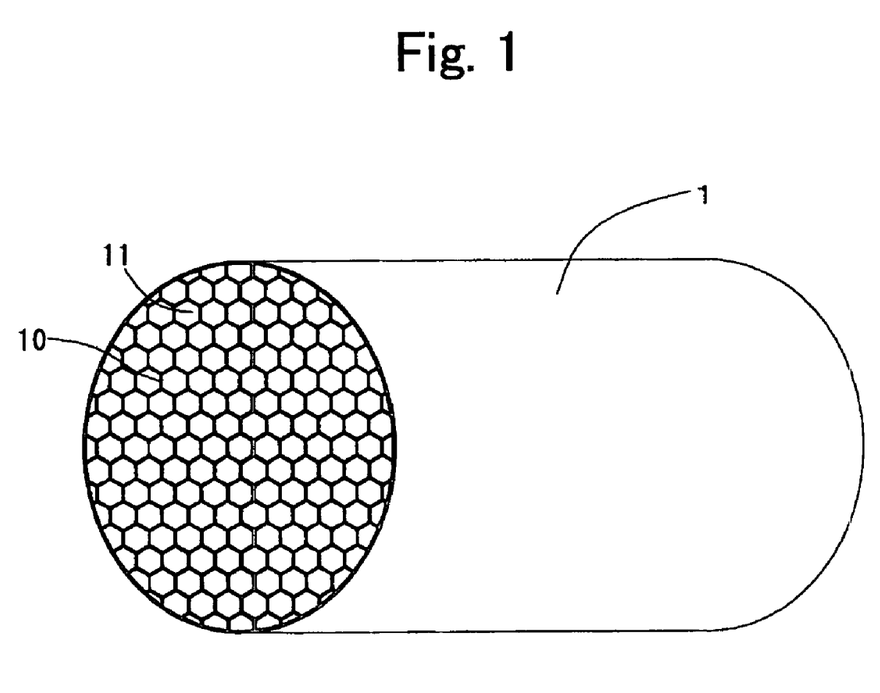
FIG. 1 is a schematic cross-sectional diagram of a catalyst for purifying exhaust gas that is directed to an example according to the present invention.
Figure 2:
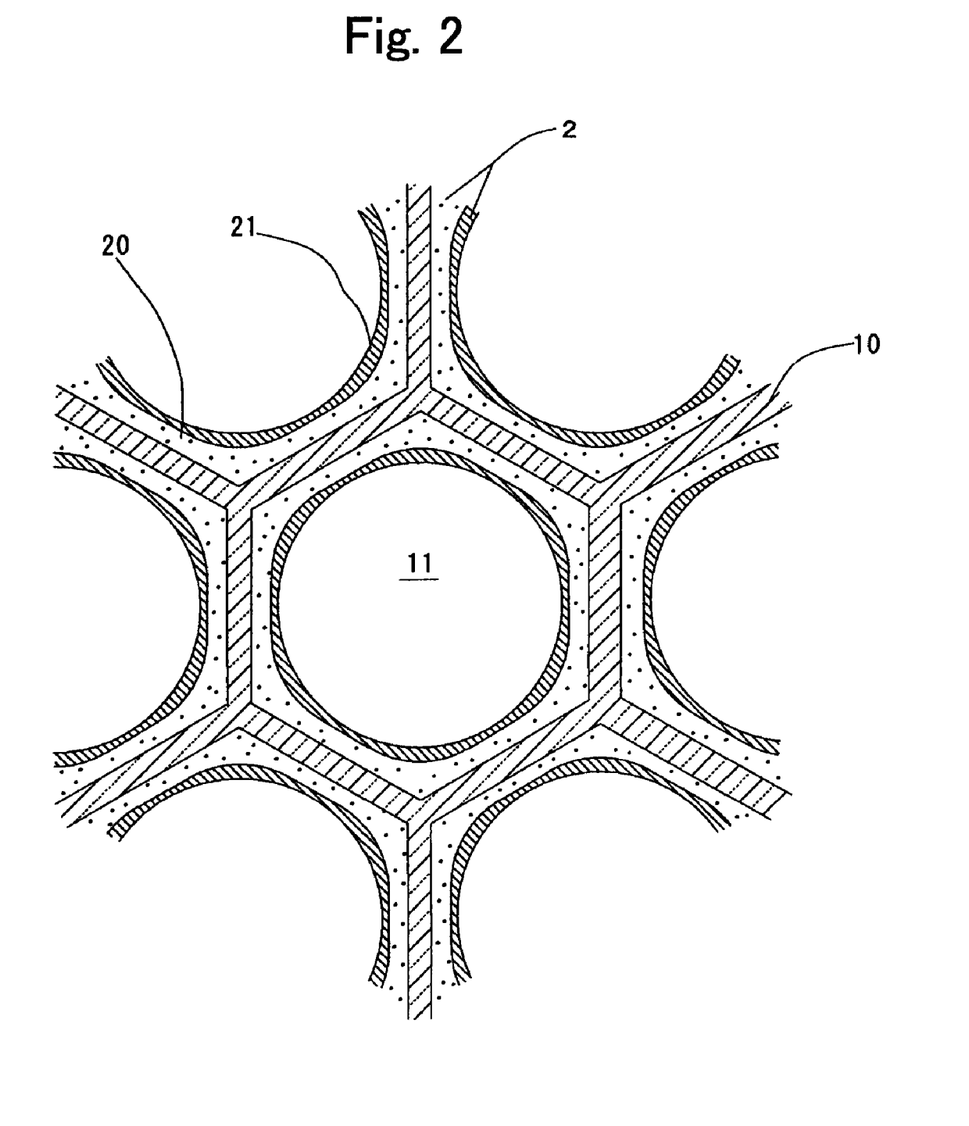
FIG. 2 is a major-portion-enlarged cross-sectional diagram of a catalyst for purifying exhaust gas that is directed to an example according to the present invention.

In FIG. 1 and FIG. 2, schematic diagrams of a catalyst for purifying exhaust gas according to a present example are illustrated. This catalyst comprises: a honeycomb substrate 1 that possesses hexagonally-configured cellular passages 11, which are demarcated by cellular partition walls 10, alone; and a catalytic coating layer 2 that is formed on the surface of the cellular partition walls 10. The catalytic coating layer is constituted of a lower layer 20, which is formed on the surface of the cellular partition walls 10, and an upper layer 21, which is formed on the surface of the lower layer 20. Hereinafter, the manufacturing method of this catalyst will be explained, instead of the detailed explanation on the constructions.

A predetermined amount of a $CeO_2$—$ZrO_2$ composite oxide powder was admixed into a predetermined amount of water, and then a predetermined amount of a Pt nitrate chemical liquid was added thereto while stirring it. This was evaporated to dryness while stirring it, and was thereafter calcined at 250° C. for 1 hour, thereby preparing a Pt/$CeO_2$—$ZrO_2$ powder on which Pt was loaded. The loading amount of Pt was 1.2% by mass (weight).

125 parts by mass of this Pt/$CeO_2$—$ZrO_2$ powder, 40 parts by mass of a γ-alumina powder, and 100 parts by mass of a binder (alumina sol) were mixed with 50 parts by mass of water, and then underwent milling by a ball mill, thereby preparing a slurry (P).

Meanwhile, a predetermined amount of a $ZrO_2$ powder was admixed into a predetermined amount of water, and then a predetermined amount of an Rh nitrate chemical liquid was added thereto while stirring it. This was evaporated to dryness while stirring it, and was thereafter calcined at 250° C. for 1 hour, thereby preparing an Rh/ZrO$_2$ powder on which Rh was loaded. The loading amount of Rh was 0.5% by mass.

60 parts by mass of this Rh/ZrO$_2$ powder, 15 parts by mass of a γ-alumina powder, and 50 parts by mass of a binder (alumina sol) were mixed with 50 parts by mass of water, and then underwent milling by a ball mill, thereby preparing a slurry (R).

Next, a honeycomb substrate, which possessed hexagonal cells and which was made of cordierite (3.5 mil; 600 cells; and 0.9-L volume), was prepared; was immersed into the slurry (P); was thereafter dried at 120° C. for 30 minutes after suctioning the excessive slurry by a suction-type coating apparatus; and was thereafter calcined at 250° C. for 2 hours. Thus, on the surface of the cellular partition walls 10, the lower layer 20 was formed in an amount of 175 g per 1 L of the honeycomb substrate 1.

After immersing the honeycomb substrate 1 with the aforementioned lower layer 20 formed into the slurry (R), it was dried at 120° C. for 30 minutes after suctioning the excessive slurry by a suction-type coating apparatus; and was thereafter calcined at 500° C. for 2 hours. Thus, on the surface of the lower layer 20, the upper layer 21 was formed in an amount of 80 g per 1 L of the honeycomb substrate 1.

In the obtained catalyst according to the present example, the catalytic coating layer 2 was formed in an amount of 255 g per 1 L of the honeycomb substrate 1; and the noble-metal loading amount per 1 L of the honeycomb substrate 1 was 1.5 g for Pt, and 0.3 g for Rh.

Comparative Example No. 1

Except that a honeycomb substrate, which possessed quadrangular cells alone (3.5 mil; 600 cells; and 0.9-L volume), was used, a catalyst for purifying exhaust gas according to Comparative Example No. 1 was prepared in the same manner as Example No. 1.

<Test-Evaluation>

Catalysts according to Example No. 1 and Comparative Example No. 1 were measured for the thicknesses of the catalytic coating layers at the cornered portions, and at the flattened portions, by means of microscopic observation. The results are given in Table 1.

TABLE 1

| | Coating Thickness (μm) | |
|---|---|---|
| | Cornered Portions | Flattened Portions |
| Ex. No. 1 | 85 | 45 |
| Comp. Ex. No. 1 | 190 | 17 |

Moreover, the three-way catalysts according to Example No. 1 and Comparative Example No. 1 were turned into a converter, respectively, and were fit onto the opposite both banks of a V-type 8-cylinder gasoline engine. And, under such a condition that the catalyst-bed temperature was 900° C., a durability test was carried out for 50 hours, durability test in which it was driven while carrying out 3-second fuel cut for every 10 seconds repetitively. Note that the banks were exchanged for 25 hours.

Figure 3:
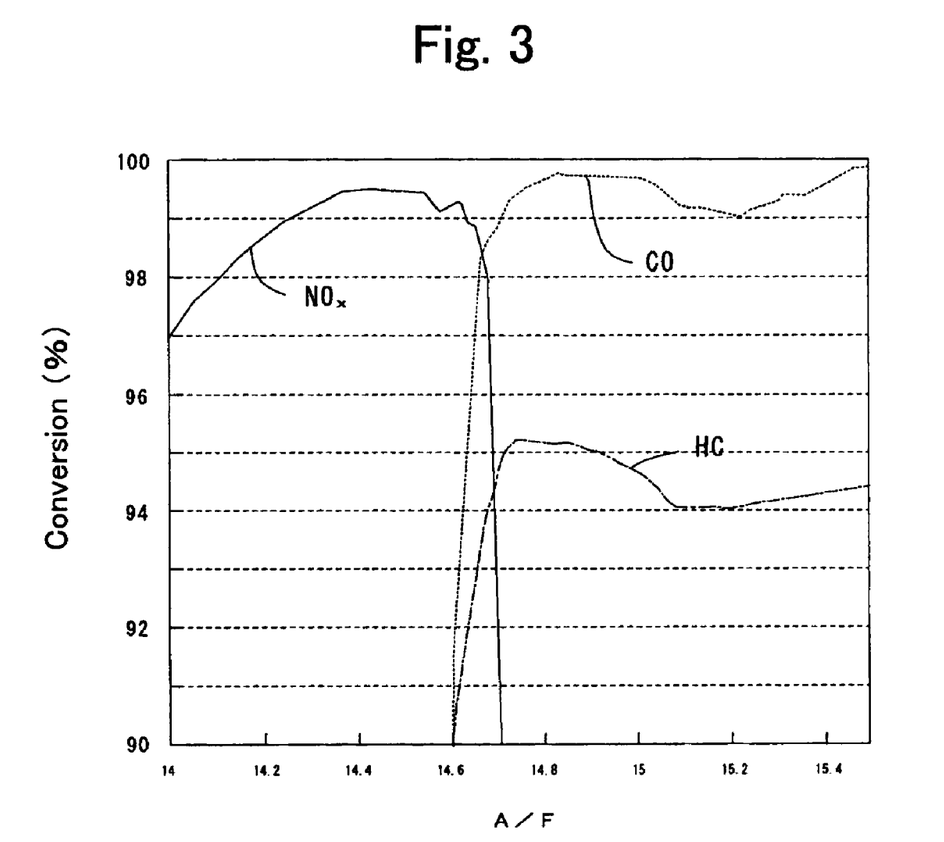
FIG. 3 is a graph for illustrating relationships between air-fuel ratios and conversions in a catalyst according to Example No. 1.
Figure 4:
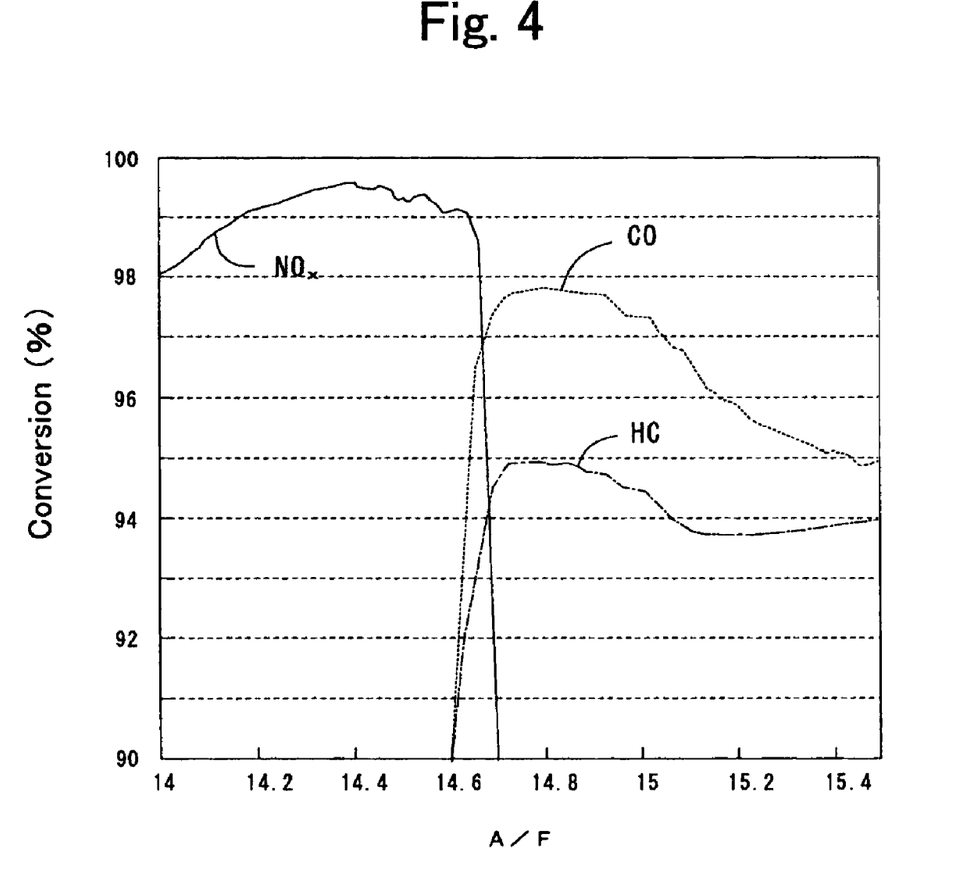
FIG. 4 is a graph for illustrating relationships between air-fuel ratios and conversions in a catalyst according to Comparative Example No. 1.

The respective catalysts after the aforementioned durability test were put in an exhaust system of a 2.4-L engine, respectively; under such a constant condition that the catalyst-bed temperature was 500° C., HC, CO and NO$_x$ conversions in such an interval that the air-fuel ratio (A/F) was 14-15.5 were measured continuously. The results are illustrated in FIG. 3 and FIG. 4. Moreover, while changing the air-fuel ratio (A/F) between 14 and 15, their oxygen occlusion amounts under such a constant condition that the catalyst-bed temperature was 500° C. were measured, respectively. The results are illustrated in FIG. 5.

When comparing FIG. 3 with FIG. 4, it is understood that the CO conversion in stoichiometry-lean atmosphere was remarkably high in the catalyst according to Example No. 1, compared with that in the catalyst according to Comparative Example No. 1. It has been found out that the oxidation reaction of CO is caused by the catalytic action of Pt mostly; in accordance with the catalyst according to Example No. 1, Pt loaded on the lower layer 20 was utilized effectively, compared with that in Comparative Example No. 1.

Figure 5:
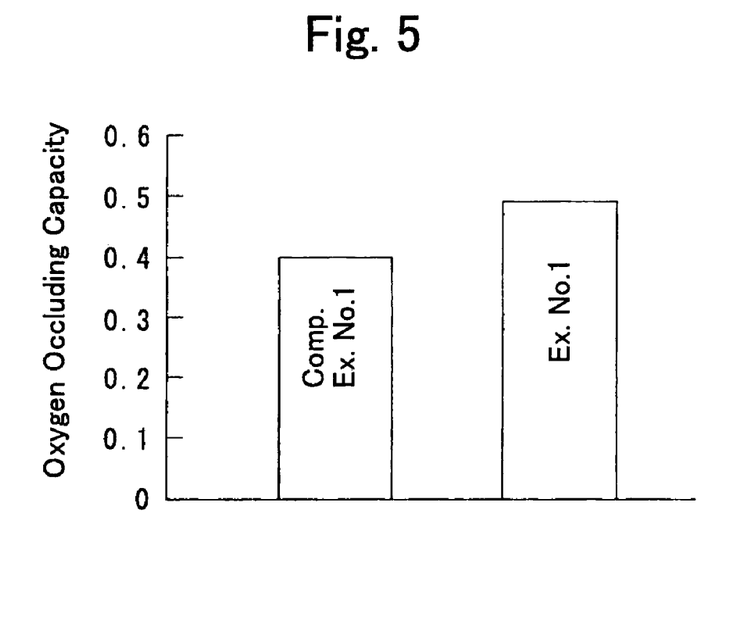
FIG. 5 is a graph for illustrating oxygen occluding capacities of the catalysts according to Example No. 1 and Comparative Example No. 1.

Moreover, as can be apparent from FIG. 5, the oxygen occluding capacity of the catalyst according to Example No. 1 improved by about 23% more than that of the catalyst according to Comparative Example No. 1 did, and accordingly it is inferable that the catalytic activities of noble metal were improved by means of the relaxation of atmospheric fluctuation in the catalyst according to Example No. 1. It is apparent that these effects were caused by the following: the total thickness of the cornered portions was so thin as being 85 μm; and the thickness of the upper layer 11 fell in a range of 15-25 μm at the flattened portions, and at the cornered portions, and it was formed thin on average; as indicated in Table 1.

<Testing Example>

In order to examine the relationship between the noble-metal loaded position in coating layer and the OSC, the following were prepared while keeping the thickness of coating layer constant: a top-coat loaded product in which a noble metal was loaded onto a range of 30 μm from the surface of coating layer only; an intermediate-layer coated product in which a noble metal was loaded onto a range of 30 μm-80 μm from the surface of coating layer only; and a bottom-layer coated product in which a noble metal was loaded onto a range of 81 μm or more from the surface of coating layer only.

When the OSC of these was evaluated by means of $C_{max}$ test, it was apparent that the nearer the noble-metal loaded position was to the surface of coating layer the higher the $C_{max}$ value was.

From these results, the catalytic efficiency of the respective samples was calculated while taking the result of the top-layer loaded product as a standard. For example, in the bottom-layer loaded product, a proportion of the range of 30 μm from the surface becomes 0.39 in terms of the area ratio between coating layers in the cross section. Therefore, the bottom-layer loaded product's $C_{max}$ equivalent value in the range of 30 μm from the surface becomes the top-layer loaded product's $C_{max}$×0.39, that is, 0.38×0.39=0.148.

Moreover, the bottom-layer loaded product's $C_{max}$ value is 0.167, and the deduction resulting from deducting the aforementioned value from this value becomes the remaining distribution's $C_{max}$, that is, 0.167−0.148=0.019.

And, when a total amount of noble metal, which distributes in a range of 81 μm or more from the bottom-layer loaded product's coating-layer surface, distributes in the range of 30 μm from the surface of coating layer, a $C_{max}$ equivalent value on this occasion becomes (0.38)×(1−0.39)=0.232. Therefore, the bottom-layer loaded product's catalytic efficiency, the catalytic efficiency for 81 μm or more from the surface of coating layer, becomes 0.019/0.232=0.082.

Specifically, the bottom-layer loaded product's catalytic efficiency can be calculated as about 8% of the top-layer loaded product's catalytic efficiency. Likewise, the intermediate-layer loaded product's catalytic efficiency is also calculated, and the results are illustrated in FIG. 6.

Figure 6:
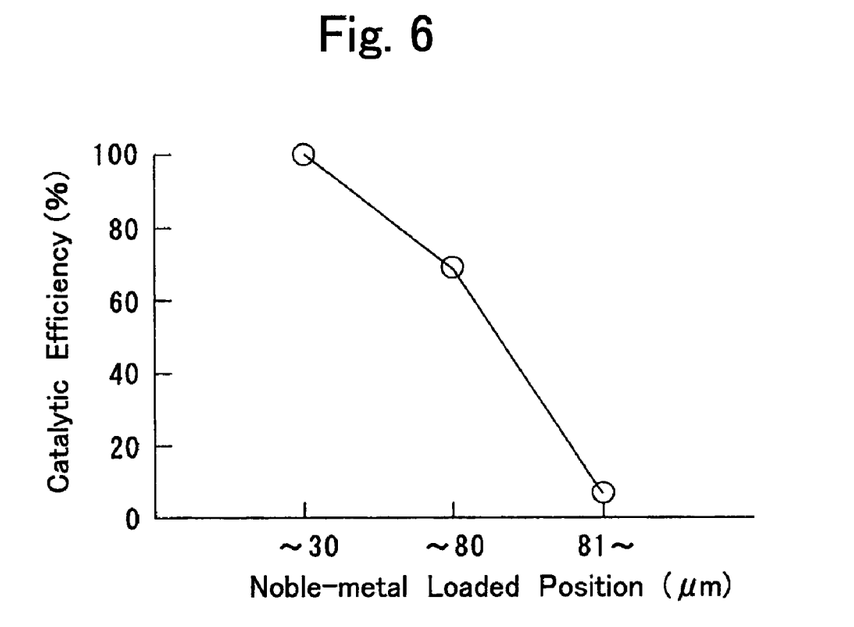
FIG. 6 is a graph for illustrating noble-metal loaded positions and catalytic efficiencies.

From FIG. 6, the deeper the loaded position of noble metal becomes the more the catalytic efficiency degrades, and accordingly it is apparent that loading it in a range of from the surface of coating layer down to 80 μm is desirable. To put it differently, it is possible to fall the loaded position of noble metal always in a range of from the surface of coating layer down to 80 μm by means of making a total thickness of the catalytic coating layer fall in a range of 10 μm-80 μm, and consequently it is understood that this is especially preferable.

The invention claimed is:

1. A catalyst for purifying exhaust gas, comprising:
   a honeycomb-shaped structure having a plurality of cellular passages demarcated by a plurality of cellular partition walls; and
   a catalytic coating layer defined on a surface of the cellular partition walls;
   wherein the catalytic coating layer comprises a lower layer containing an oxygen storage capacity material and an upper layer defined on a surface of the lower layer and containing a catalytic noble metal;
   at least 90% of the catalytic coating layer exhibits a total thickness in a range of 10 μm-80 μm;
   a thickness of the upper layer is 5 μm-40 μm;
   a first catalytic noble metal being at least one member selected from the group consisting of Pt, Pd and Rh is loaded onto the upper layer; and
   a second catalytic noble metal is loaded onto the lower layer, the second catalytic noble metal being a catalytic noble metal different from the first catalytic noble metal.

2. The catalyst for purifying exhaust gas set forth in claim 1, wherein the thickness of said upper layer is 30 μm or less.

3. The catalyst for purifying exhaust gas set forth in claim 1, wherein:
   Rh is loaded onto said upper layer; and
   at least one of Pt and Pd is loaded onto said lower layer.

* * * * *